United States Patent
Sun et al.

(10) Patent No.: US 9,491,714 B2
(45) Date of Patent: Nov. 8, 2016

(54) INTERFERENCE CANCELLATION METHOD, SYSTEM, DEVICE AND UE

(71) Applicant: Samsung Electronics Co., Ltd., Gyeonggi-do (KR)

(72) Inventors: Chengjun Sun, Beijing (CN); Chenyang Yang, Beijing (CN); Yafei Tian, Beijing (CN); Yingyang Li, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/443,762

(22) PCT Filed: Nov. 15, 2013

(86) PCT No.: PCT/KR2013/010411
§ 371 (c)(1),
(2) Date: May 19, 2015

(87) PCT Pub. No.: WO2014/077625
PCT Pub. Date: May 22, 2014

(65) Prior Publication Data
US 2015/0296462 A1  Oct. 15, 2015

(30) Foreign Application Priority Data
Nov. 19, 2012  (CN) .......................... 2012 1 0468448

(51) Int. Cl.
*H04W 4/00* (2009.01)
*H04W 52/24* (2009.01)
(Continued)

(52) U.S. Cl.
CPC ........... *H04W 52/241* (2013.01); *H04B 15/02* (2013.01); *H04B 17/345* (2015.01); *H04L 1/00* (2013.01); *H04L 1/0003* (2013.01);
(Continued)

(58) Field of Classification Search
None
See application file for complete search history.

(56) References Cited

U.S. PATENT DOCUMENTS 9,225,502 B2 * 12/2015 Asplund ................. H04L 1/002
370/329
2010/0227637 A1 9/2010 Kwon et al.
(Continued)

FOREIGN PATENT DOCUMENTS

KR  1020100099414  9/2010
KR  1020110100916  9/2011
WO  WO 2012/064998  5/2012

OTHER PUBLICATIONS

PCT/ISA/237 Written Opinion issued on PCT/KR2013/010411 (pp. 10).
(Continued)

*Primary Examiner* — Anh-Vu Ly
(74) *Attorney, Agent, or Firm* — The Farrell Law Firm, P.C.

(57) ABSTRACT

Examples of the present application provide an interference cancellation method, system, device and a UE. The interference cancellation method of a communication network including a plurality of User Equipments (UEs) and Base Stations (BSs) includes: acquiring a Signal to Noise Ratio (SNR) and Interference to Noise Ratio (INR) of a downlink signal detected by a first UE and a SNR and INR of a downlink signal detected by a second UE, respectively through a first BS and a second BS; and notifying the first BS and the second BS of a transmission mode of associated UEs, wherein the first UE is located in a cell served by the first BS, and the second UE is located in a cell served by the second BS.

20 Claims, 4 Drawing Sheets

(51) Int. Cl.
*H04B 15/02* (2006.01)
*H04L 1/00* (2006.01)
*H04B 17/345* (2015.01)
*H04W 84/04* (2009.01)
*H04W 92/20* (2009.01)

(52) U.S. Cl.
CPC ........ *H04W 52/244* (2013.01); *H04W 52/243* (2013.01); *H04W 84/045* (2013.01); *H04W 92/20* (2013.01)

(56) References Cited

U.S. PATENT DOCUMENTS

| | | |
|---|---|---|
| 2010/0248712 A1 | 9/2010 | Lee et al. |
| 2010/0272218 A1* | 10/2010 | Yeh ................. H04B 7/024 375/330 |
| 2010/0291945 A1 | 11/2010 | Jang |
| 2010/0317355 A1 | 12/2010 | Zangi et al. |
| 2011/0218000 A1 | 9/2011 | Noh et al. |
| 2011/0269493 A1 | 11/2011 | Zhu et al. |
| 2012/0040701 A1 | 2/2012 | Tong et al. |
| 2012/0178462 A1* | 7/2012 | Kim ................. H04W 72/048 455/450 |
| 2012/0218968 A1* | 8/2012 | Kim ................. H04L 5/0053 370/329 |
| 2013/0121186 A1* | 5/2013 | Vajapeyam ......... H04W 72/085 370/252 |
| 2013/0203398 A1* | 8/2013 | Callard ............. H04W 88/08 455/418 |
| 2013/0229971 A1* | 9/2013 | Siomina ............. H04W 24/10 370/312 |
| 2014/0286291 A1* | 9/2014 | Einhaus .............. H04B 7/024 370/329 |

OTHER PUBLICATIONS

PCT/ISA/210 Search Report issued on PCT/KR2013/010411 (pp. 4).
European Search Report dated Jun. 29, 2016 issued in counterpart application No. 13856002.4-1855, 7 pages.

* cited by examiner

INTERFERENCE CANCELLATION METHOD, SYSTEM, DEVICE AND UE

PRIORITY

This application is a National Phase Entry of PCT International Application No. PCT/KR2013/010411, which was filed on Nov. 15, 2013, and claims a priority to Chinese Patent Application No. 201210468448.7, which was filed on Nov. 19, 2012, the contents of each of which are incorporated herein by reference.

TECHNICAL FIELD

The present application relates to interference cancellation techniques in wireless communications, and more particularly, to an interference cancellation method, system, device and a User Equipment (UE).

BACKGROUND ART

The design of cellular systems has evolved to pursue the spatial capacity from simply pursuing the spectrum efficiency. Cell splitting is a common method to improve the spatial reuse efficiency of the spectrum. However, the cell radius in the fourth generation mobile communication (4G) system has been relatively small, and the potentiality for continuous splitting is poor. In addition, the distribution of users in space is not uniform, and a large number of users in a cell may locate in some hot spots and occasions. A heterogeneous network is more suitable for this scenario of uneven user distribution. The basic ideas of the heterogeneous network are as follows. A macro base station transmitting with larger power seamlessly covers a macro cell, and provides basic access; low-power base stations are deployed in hot occasions of the macro cell and provide high-speed data services. Low-power base stations may include pico base stations, femto base stations, and relay nodes (hereinafter uniformly referred to as micro base stations).

In a homogeneous network, inter-cell interference is serious only at the edge of a cell. However, in a heterogeneous network, the interference between the macro cell and an inside micro cell has unique property. The deployment of a low-power node is more random. For instance, an indoor femto base station is deployed by the user, and the location and switch thereof are random. The femto base station may be located at the edge of a macro cell, or may be located in the center of the macro cell. The power of a macro base station differs considerably from that of a micro base station, which results in asymmetric downlink.

Inter-cell interference mitigation techniques are of the following three main types. The first one is avoidance or orthogonal division through time, frequency, and spatial domain, such as the Fractional Frequency Reuse (FFR) technique and the Almost Blank Subframes (ABSF) technique. The second one is to perform power control with base station coordination so as to decrease the interference level, thus the interference may be taken as background noise, such as the Soft Frequency Reuse (SFR) technique. The third one is interference cancellation. When the interference is strong, the interference can be demodulated and then canceled.

DISCLOSURE OF INVENTION

Technical Problem

However, the traditional interference cancellation is a passive processing scheme. The demodulation will be performed when a condition of interference-to-signal ratio is met at the receiver, otherwise, the interference will still be taken as noise or other orthogonal avoidance methods will be used. The traditional interference cancellation methods limit the throughput of the whole network.

Solution to Problem

According to one of various embodiments of the present disclosure, there is provided an interference cancellation method of a communication network including a plurality of User Equipments (UEs) and Base Stations (BSs) comprising: acquiring a Signal to Noise Ratio (SNR) and Interference to Noise Ratio (INR) of a downlink signal detected by a first UE and a SNR and INR of a downlink signal detected by a second UE, respectively through a first BS and a second BS; and notifying the first BS and the second BS of a transmission mode of associated UEs, wherein the first UE is located in a cell served by the first BS, and the second UE is located in a cell served by the second BS, and wherein the associated UEs are a pair of UEs including the first UE and the second UE.

Moreover, according to one of various embodiments of the present disclosure, there is also provided an interference cancellation system of a communication network including a plurality of User Equipments (UEs) and Base Stations (BSs), comprising: a first UE, configured to detect a Signal to Noise Ratio (SNR), and Interference to Noise Ratio (INR) of a downlink signal, and report the detected SNR and INR of the downlink signal to a first BS; a second UE, configured to detect a SNR and INR of a downlink signal, and report the detected SNR and INR of the downlink signal to a second BS; the first BS, configured to send the SNR and INR of the downlink signal reported by the first UE to a central control node, and send a transmission mode of associated UEs sent by the central control node to the first UE; the second BS, configured to send the SNR and INR of the downlink signal reported by the second UE to the central control node, and send the transmission mode of associated UEs sent by the central control node to the second UE; and the central control node, configured to acquire the SNR and INR of the downlink signal detected by the first UE and the SNR and INR of the downlink signal detected by the second UE respectively through the first BS and the second BS, and respectively send the transmission mode of associated UEs to the first BS and the second BS, wherein the first UE is located in a cell served by the first BS, and the second UE is located in a cell served by the second BS, and wherein the associated UEs are a pair of UEs including the first UE and the second UE.

Moreover, according to one of various embodiments of the present disclosure, there is also provided an apparatus for interference cancellation in a communication network including a plurality of User Equipments (UEs) and Base Stations (BSs), comprising: an information acquiring module, configured to acquire a SNR and INR of a downlink signal detected by a first UE and a SNR and INR of a downlink signal detected by a second UE, respectively through a first BS and a second BS; and a transmission mode sending module, configured to send a transmission mode of associated UEs to the first BS and the second BS, wherein the first UE is located in a cell served by the first BS, and the second UE is located in a cell served by the second BS, and wherein the associated UEs are a pair of UEs including the first UE and the second UE.

Moreover, according to one of various embodiments of the present disclosure, there is also provided an apparatus for interference cancellation in a communication network including a plurality of User Equipments (UEs) and Base Stations (BSs), comprising: an information acquiring module, configured to acquire a SNR and INR of a downlink signal detected by a first UE and a SNR and INR of a downlink signal detected by a second UE, respectively through a first BS and a second BS; and a transmission mode sending module, configured to send a transmission mode of associated UEs to the first BS and the second BS, wherein the first UE is located in a cell served by the first BS, and the second UE is located in a cell served by the second BS, and wherein the associated UEs are a pair of UEs including the first UE and the second UE.

Moreover, according to one of various embodiments of the present disclosure, there is also provided a UE for interference cancellation in a communication network, comprising: a detecting module, configured to detect a SNR and INR of a downlink signal; a reporting module, configured to report the SNR and INR of the downlink signal to a central control node through a base station; and a receiving module, configured to receive a transmission mode of associated UEs from the central control node through the base station, wherein the UE is included in the associated UEs.

Moreover, according to one of various embodiments of the present disclosure, there is also provided a method for interference cancellation of a User Equipment (UE) in a communication network, comprising: detecting a SNR and INR of a downlink signal; reporting the SNR and INR of the downlink signal to a central control node through a base station; and receiving a transmission mode of associated UEs from the central control node through the base station, wherein the UE is included in the associated UEs.

Advantageous Effects of Invention

In view of above, examples of the present application provide an interference cancellation method, which can deal with the inter-cell interference better and improve the throughput of cellular networks.

Examples of the present application further provide an interference cancellation system, device and an UE, which can deal with the inter-cell interference better and improve the throughput of cellular networks.

As can be seen from above mentioned technical solutions, in the present application, two base stations, by coordinating transmission modes of associated UEs, can control the impact of inter-cell interference so that the interference can be more easily demodulated and canceled, thereby enhancing the total data rate of two users, and improving the network throughput.

MODE FOR THE INVENTION

In order to make objectives, technical solutions and advantages of the present application clearer, the present application will be described in detail hereinafter with reference to accompanying drawings.

Figure 1:
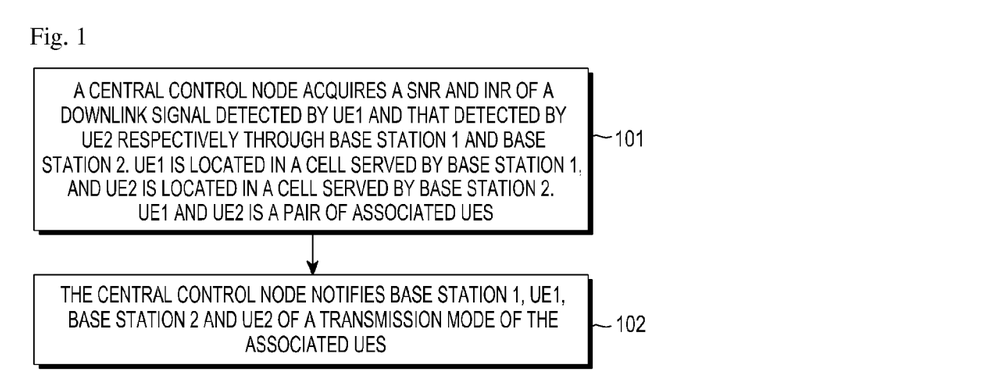
FIG. 1 is a flowchart illustrating an interference cancellation method according to an example of the present application.

FIG. 1 is a flowchart illustrating an interference cancellation method according to an example of the present application.

The present application provides an interference cancellation method, as shown in FIG. 1. The method includes the following processes.

Block 101, a central control node acquires a Signal to Noise Ratio (SNR) and Interference to Noise Ratio (INR) of a downlink signal(s) detected by UE1 and a SNR and INR of a downlink signal(s) detected by UE2 respectively through base station 1 and base station 2. UE1 is located in a cell served by base station 1, and UE2 is located in a cell served by base station 2. UE1 and UE2 is a pair of associated UEs.

Block 102, the central control node notifies base station 1, UE1, base station 2 and UE2 of a transmission mode of the associated UEs.

In above mentioned block 101, base station 1 may select UE1, and send information of selected UE1 to the central control node, and base station 2 may select UE2, and send information of selected UE2 to the central control node. Alternatively, base station 1 and base station 2 may respectively send information of served UEs to the central control node, and the central control node selects associated UEs, namely UE1 and UE2.

Base station 1and base station 2 may be two macro base stations in a homogeneous network, or may be respectively a macro base station and a micro base station in a heterogeneous network.

In above method, the manner for detecting a SNR and INR of a downlink signal(s) respectively by UE1 and UE2 may include the following.

UE1 detects signal power of a base station serving a cell where UE1 is located, interference power of a base station serving an adjacent cell of UE1 and background noise power, the SNR of a downlink signal detected by UE1 is a ratio of the signal power of the base station serving the cell where UE1 is located to the background noise power, and the INR of a downlink signal detected by UE1 is a ratio of the interference power of the base station serving the adjacent cell of UE1 to the background noise power; UE2 detects signal power of a base station serving a cell where UE2 is located, interference power of a base station serving an adjacent cell of UE2 and background noise power, the SNR of a downlink signal detected by UE2 is a ratio of the signal power of the base station serving the cell where UE2 is located to the background noise power, and the INR of a downlink signal detected by UE2 is a ratio of the interference power of the base station serving the adjacent cell of UE2 to the background noise power.

The base station serving the cell where UE1 is located is base station 1, and base station serving the adjacent cell of UE1 is base station 2; the base station serving the cell where UE2 is located is base station 2, and base station serving the adjacent cell of UE2 is base station 1.

The central control node may determine a transmission mode of associated UEs according to acquired SNR(s) and INR(s) through base station 1 and base station 2.

The transmission mode of associated UEs includes a Modulation and Coding Scheme (MCS) of UE1, a demodulation order of UE1, a MCS of UE2, and/or a demodulation order of UE2.

In above mentioned block 102, the method for notifying, by the central control node, UE1 and UE2 of the transmission mode of the associated UEs may be the following. The central control node may notify UE1 through base station 1 and notify UE2 through base station 2.

The central control node may be configured in base station 1 or base station 2, or may be a stand-alone device or functional unit.

After the block 102, the method may further include the following.

Base station 1 or base station 2 may send a signal according to the transmission mode(s) of associated UE(s). Or UE 1 or UE 2 may receive a signal according to the transmission mode(s) of associated UE(s).

The present application will be described in detail hereinafter with reference to specific examples.

The First Example

Figure 2:
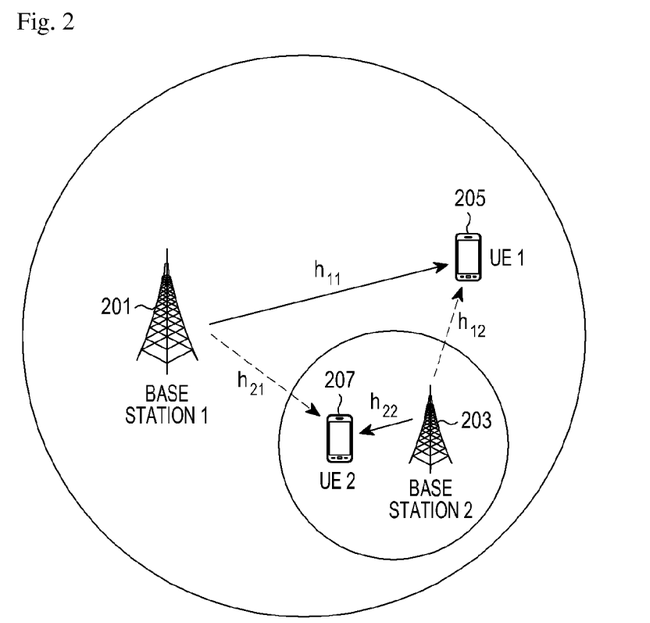
FIG. 2 is a schematic diagram illustrating system environment according to the first example of the present application.

FIG. 2 is a schematic diagram illustrating system environment according to the first example of the present application.

System environment of the first example of the present application is shown in FIG. 2. A macro base station BS1(201) and a micro base station BS2(203) are deployed in a circular region. The two base stations are connected to each other and interact information via a backbone network. A central control node (not shown) may be set in the macro base station BS1(201).

The central control node selects a UE, i.e. UE1(205), from a macro cell served by the macro base station BS1(201), and selects another UE, i.e. UE2(207), from a micro cell served by the micro base station BS2(203), and takes the two selected UEs(205, 207) as a pair of associated UEs. In general, the number of UEs in a micro cell is far less than the number of UEs in a macro cell, so it is possible to determine a UE in the micro cell first, and then determine a UE in the macro cell associated with the UE in the micro cell. There are a variety of principles for selecting associated UEs. A possible solution is as follows. A UE, denoted by UE2(207), in the micro cell is randomly selected first, and subsequently a circular region is determined by taking the distance between the micro base station and the macro base station as a radius, and a UE outside the circular region is randomly selected and taken as UE1(205) associated with UE2(207).

Suppose the base stations and the UEs are single antenna devices, and perform processing in one time-frequency resource block. A multiple carrier application and a multiple antennas device may be extended similarly.

When each of the two base stations sends a downlink signal(s) respectively, each of the two UEs performs a channel measurement on a direct signal link and a cross interference link thereof. Direct signal links refer to the link $h_{11}$ from BS1(201) to UE1 (205) and the link $h_{22}$ from BS2(203) to UE2(207). Cross interference links refer to the link $h_{21}$ from BS1(201) to UE2(207) and the link $h_{12}$ from BS2(203) to UE1(205). Because a UE can only detect signal power of a base station serving a cell where the UE is located, interference power of a base station serving an adjacent cell of the UE and background noise power, when the transmitting powers of the macro base station BS1(201) and the micro base station BS2(203) are respectively $P_1$, and $P_2$, the signal power of the base station serving the cell where UE1(205) is located (namely BS1(201)) detected by UE1(205) is $P_2$, the interference power of the base station serving the adjacent cell of UE1(205) (namely BS2(203)) detected by UE1 is $P_2$; the signal power of the base station serving the cell where UE2(207) is located (namely BS2(203)) detected by UE2 is $P_2$, the interference power of the base station serving the adjacent cell of UE2(207) (namely BS1(201)) detected by UE2(207) is $P'_{21}=|h_{21}|^2 P_1$.

Suppose either of background noise power of UE1(205) and UE2(207) is $N_0$, the SNR and INR detected by UE1(205) may be respectively the following.

$$SNR_1 = \frac{|h_{11}|^2 P_1}{N_0}, INR_1 = \frac{|h_{12}|^2 P_2}{N_0}$$

The SNR and INR detected by UE2(207) may be respectively the following.

$$SNR_2 = \frac{|h_{22}|^2 P_2}{N_0}, INR_2 = \frac{|h_{21}|^2 P_1}{N_0}$$

UE1(205) sends the values of detected SNR and INR, namely $SNR_1$ and $INR_1$ to BS1(201); UE2(207) sends the values of detected SNR and INR, namely $SNR_2$ and $INR_2$ to BS2(203), BS2(203) sends $SNR_2$ and $INR_2$ to BS1(201) via the backbone network. Thus BS1(201) possesses information of SNRs and INRs of four links.

BS1(201), according to received information of SNRs and INRs, calculates a maximum total data rate capable of being transmitted by the interference network, as well as the transmission data rate of each of the two UEs. The calculation method includes the following.

Step 1, if SNRs and INRs of the four links satisfy the condition that $SNR_1 < INR_2$ and $SNR_2 > INR_1$, step 2 is performed; if SNRs and INRs of the four links do not satisfy above mentioned condition, an orthogonal transmission mode FFR or ABSF is adopted.

Step 2, there are two specific cases based on different SNRs.

1) If $SNR_1 SNR_2 + SNR_1 \geq INR_1 INR_2 + INR_2$, then it is necessary for the total data rate to meet the following constraint.

$$R_{sum} \leq \log(1 + SNR_2 + INR_2)$$

It is necessary for the transmission data rate of a single UE to meet the following constraint.

$$R_1 \leq \log\left(1 + \frac{SNR_1}{1 + INR_1}\right)$$

$$R_2 \leq \log(1 + SNR_2)$$

In this case, if the transmission data rate of UE1 $R_1$ is given first, then the transmission data rate of UE2(207) may be the following.

$$R_2 = \begin{cases} R_{sum} - R_1, & \text{if } R_{sum} - R_1 \leq \log(1 + SNR_2) \\ \log(1 + SNR_2), & \text{otherwise} \end{cases}$$

Similarly, if the transmission data rate of UE2(207) $R_2$ is given first, then the transmission data rate of UE1(205) may be the following.

$$R_1 = \begin{cases} R_{sum} - R_2, & \text{if } R_{sum} - R_2 \leq \log\left(1 + \frac{SNR_1}{1 + INR_1}\right) \\ \log\left(1 + \frac{SNR_1}{1 + INR_1}\right), & \text{otherwise} \end{cases}$$

In this case, the total data rate is limited by a multiple-access channel of UE2(207). Either of the demodulation orders of UE1(205) and UE2(207) is that the signal of BS1(201) is demodulated first, and then the signal of BS2(203) is demodulated. Therefore, UE1(205) directly demodulates the signal of BS1(201), and takes the signal of BS2(203) as noise; UE2(207) demodulates the signal of BS1(201) first, and takes the signal of BS2(203) as noise at this time, subsequently UE2(207) deletes the signal of BS1(201), and then demodulates the signal of BS2(203).

2) If $SNR_1 SNR_2 + SNR_1 < INR_1 INR_2 + INR_2$, then it is necessary for the total data rate to meet the following constraint.

$$R_{sum} = \log\left(1 + \frac{SNR_1}{1 + INR_1}\right) + \log(1 + SNR_2)$$

It is still necessary for the transmission data rate of a single UE to meet the following constraint.

$$R_1 \leq \log\left(1 + \frac{SNR_1}{1 + INR_1}\right)$$

$$R_2 \leq \log(1 + SNR_2)$$

In this case, the total data rate is limited by a multiple-access channel of UE1(205). At this time, the constraint of the transmission data rate of a single UE is consistent with the constraint of total data rate, so the transmission data rate of UE1(205) and that of UE2(207) only needs to satisfy the constraint of the transmission data rate of a single UE. Similarly, either of the demodulation orders of UE1(205) and UE2(207) is that a signal of BS1(201) is demodulated first, and then a signal of BS2(203) is demodulated. Therefore, UE 1(205) directly demodulates the signal of BS1(201), and takes the signal of BS2(203) as noise; UE2(207) demodulates and deletes the signal of BS1(201), and then demodulates the signal of BS2(203).

The MCS may be determined by the data rate. Subsequently, BS1(201) sends determined transmission modes (including a MCS and a demodulation order) of the two UEs to BS2(203) via the backbone network, the two base stations respectively notify the corresponding UE of transmission modes of the two UEs through a downlink control channel. Here, each base station notifies the corresponding UE of MCSs and demodulation orders of the corresponding UE and the other UE.

Figure 3:
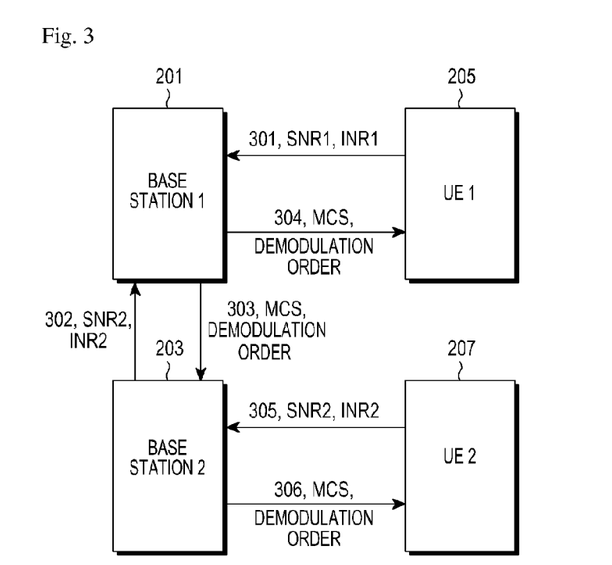
FIG. 3 is a schematic diagram illustrating signaling interaction according to the first example of the present application.

FIG. 3 is a schematic diagram illustrating signaling interaction according to the first example of the present application.

Signaling interaction of the whole process is shown in FIG. 3, which includes the following.

Flow 301, UE1(205) sends the values of detected SNR and INR, namely $SNR_1$ and $INR_1$ to BS1(201).

Flow 305, UE2(207) sends the values of detected SNR and INR, namely $SNR_2$ and $INR_2$ to BS2(203).

Flow 302, BS2(203) sends $SNR_2$ and $INR_2$ to BS1(201) via the backbone network.

Flow 303, BS1(201) sends MCSs and demodulation orders of the two UEs to BS2(203) via the backbone network.

Flow 304, BS1(201) sends MCSs and demodulation orders of the two UEs to UE1(205).

Flow 306, BS2(203) sends MCSs and demodulation orders of the two UEs to UE2(207).

Selectively, when it is not necessary for UE1(205) to demodulate the signal of BS2(203), BS1(201) may only send the MCS and the demodulation order of UE1(205) to UE1(205), or only send the MCS of UE1(205) to UE1(205). Similarly, when it is not necessary for UE2(207) to demodulate the signal of BS1(201), BS2(203) may only send the MCS and the demodulation order of UE2(207) to UE2(207), or only send the MCS of UE2(207) to UE2(207).

The Second Example

Figure 4:
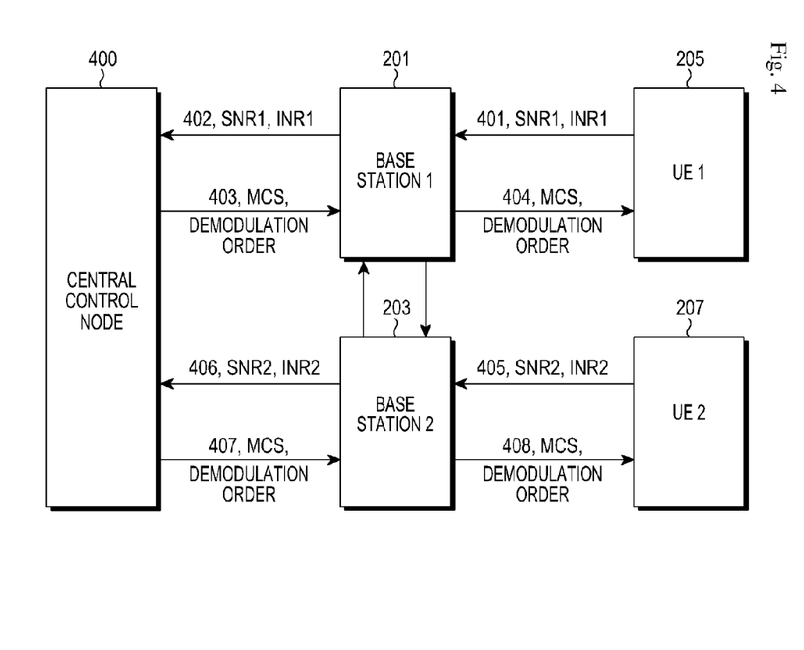
FIG. 4 is a schematic diagram illustrating signaling interaction according to the second example of the present application.

FIG. 4 is a schematic diagram illustrating signaling interaction according to the second example of the present application.

In this example, suppose there is a stand-alone central control node(400) in the system, then BS1(201) and BS2(203) report channel measurement information, namely $SNR_1$, $INR_1$, $SNR_2$ and $INR_2$, to the central control node (400).

After calculating the MCSs and demodulation orders of the two UEs, the central control node(400) sends the calculated transmission mode information to BS1(201) and BS2(203), and then BS1(201) and BS2(203) respectively forward the transmission mode information to UE1(205) and UE2(207). In this case, the signaling interaction of the whole process is shown in FIG. 4, which includes the following.

Flow 401, UE1(205) sends the values of detected SNR and INR, namely $SNR_1$ and $INR_1$ to BS1(201).

Flow 405, UE2(207) sends the values of detected SNR and INR, namely $SNR_2$ and $INR_2$ to BS2(203).

Flow 402, BS1(201) sends $SNR_1$ and $INR_1$ to the central control node(400) via the backbone network.

Flow 406, BS2(203) sends $SNR_2$ and $INR_2$ to the central control node(400) via the backbone network.

Flow 403, the central control node(400) sends MCSs and demodulation orders of the two UEs to BS1(201) via the backbone network.

Flow 407, the central control node(400) sends MCSs and demodulation orders of the two UEs to BS2(203) via the backbone network.

Flow 404, BS1(201) sends MCSs and demodulation orders of the two UEs to UE1(205).

Flow 408, BS2(203) sends MCSs and demodulation orders of the two UEs to UE2(207).

Selectively, when it is not necessary for UE1(205) to demodulate the signal of BS2(203), BS1(201) may only send the MCS and the demodulation order of UE1(205) to UE1(205), or only send the MCS of UE1(205) to UE1(205). Similarly, when it is not necessary for UE2(207) to demodulate the signal of BS1(201), BS2(203) may only send the MCS and the demodulation order of UE2(207) to UE2(207), or only send the MCS of UE2(207) to UE2(207).

The data rate performance of the method of examples of the present application will be compared with that of an orthogonal transmission method (such as FFR or ABSF) through a group of experiments hereinafter. Based on the network architecture shown in FIG. 2, suppose the location of the macro base station is (0m, 0m), the location of the micro base station is (118m, 118m), the location of the micro UE is (69m, 153m), and the macro UE moved from (0m, 180m) to (0m, 480m). The model of path loss from the macro base station to the two UEs is as follows.

$$P_L = 128.1 + 37.6 \lg(d/1000)$$

The model of path loss from the micro base station to the two UEs is as follows.

$$P_L = 140.7 + 36.7 \lg(d/1000)$$

The distribution of all locations satisfies the condition $SNR_1 < INR_2$ and $SNR_2 > INR_1$.

Figure 5:
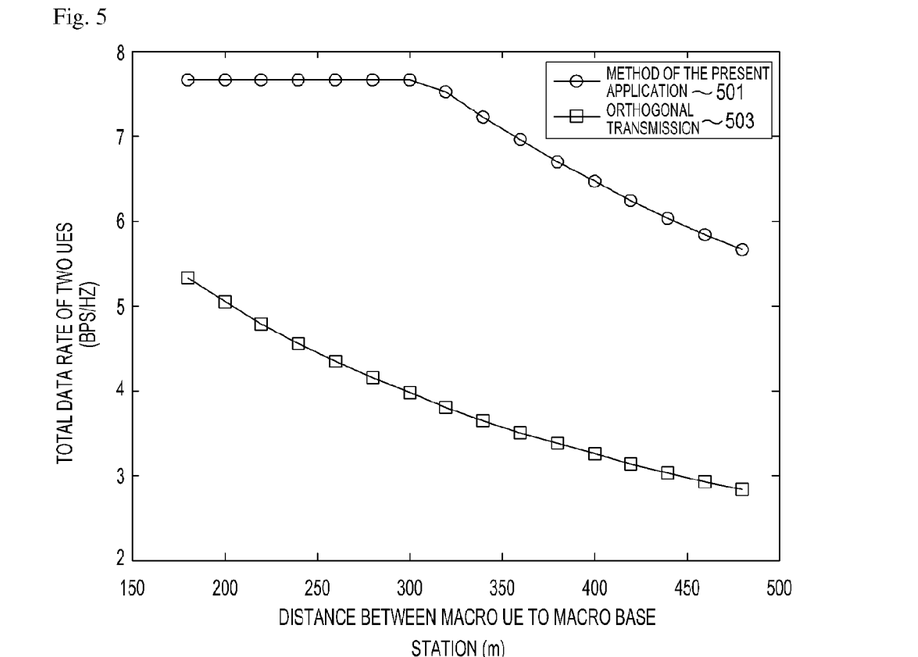
FIG. 5 is a schematic diagram illustrating performance comparison of transmission data rate according to an example of the present application.

FIG. 5 is a schematic diagram illustrating performance comparison of transmission data rate according to an example of the present application.

The transmission data rates and MCSs of the two UEs are selected according to the method of examples of the present application, and the demodulation is performed in UE according to the determined order, then the achievable total data rate(501) of the two UEs is shown in FIG. 5. The achievable total data rate(503) of the orthogonal transmission method is also shown in FIG. 5.

As can be seen, the performance of the method of examples of the present application has a great improvement compared to the performance of the orthogonal transmission method. When the location of the macro UE is far away from the macro base station, the data rate of the method of examples of the present application is nearly twice of that of orthogonal transmission method.

The present application also provides an interference cancellation system.

Figure 6:
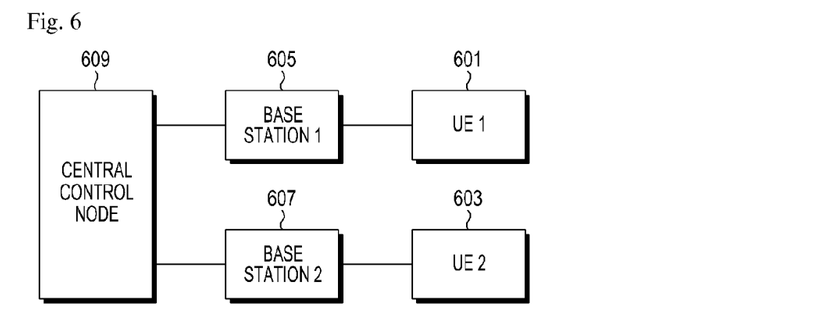
FIG. 6 is a schematic diagram illustrating an interference cancellation system according to an example of the present application.

FIG. 6 is a schematic diagram illustrating an interference cancellation system according to an example of the present application.

As shown in FIG. 6, the system includes UE1(601), UE2(603), base station 1(605), base station 2(607), and a central control node(609).

UE1(601) is configured to detect a SNR and INR of a downlink signal(s), and report detected SNR and INR of a downlink signal(s) to base station 1(605).

UE2(603) is configured to detect a SNR and INR of a downlink signal(s), and report detected SNR and INR of a downlink signal(s) to base station 2(607).

UE1(601) is located in a cell served by base station 1(605), and UE2(603) is located in a cell served by base station 2(607). UE1(601) and UE2(603) is a pair of associated UEs.

Base station 1(605) is configured to send SNR and INR of a downlink signal(s) reported by UE1(601) to the central control node(609), and send a transmission mode of the associated UEs sent by the central control node(609) to UE1(601).

Base station 2(607) is configured to send SNR and INR of a downlink signal(s) reported by UE2(603) to the central control node(609), and send a transmission mode of the associated UEs sent by the central control node(609) to UE2(603).

The central control node(609) is configured to acquire the SNR and INR of a downlink signal(s) detected by UE1(601) and the SNR and INR of a downlink signal(s) detected by UE2(603) respectively through base station 1(605) and base station 2(607), and respectively send the transmission mode of the associated UEs to base station 1(605) and base station 2(607).

In above mentioned system, base station 1(605) and base station 2(607) may be two macro base stations in a homogeneous network, or may be respectively a macro base station and a micro base station in a heterogeneous network.

In above mentioned system, the manner for detecting a SNR and INR of a downlink signal(s) by UE1(601) and UE2(603) may include the following.

UE1(601) detects signal power of a base station serving a cell where UE1(601) is located, interference power of a base station serving an adjacent cell of UE1(601) and background noise power, the SNR is a ratio of the signal power of the base station serving the cell where UE1(601) is located to the background noise power, and the INR is a ratio of the interference power of the base station serving the adjacent cell of UE1(601) to the background noise power; UE2(603) detects signal power of a base station serving a cell where UE2(603) is located, interference power of a base station serving an adjacent cell of UE2(603) and background noise power, the SNR is a ratio of the signal power of the base station serving the cell where UE2(603) is located to the background noise power, and the INR is a ratio of the interference power of the base station serving the adjacent cell of UE2(603) to the background noise power.

The transmission mode of associated UEs includes a MCS of UE1(601), a demodulation order of UE1(601), a MCS of UE2(603), and/or a demodulation order of UE2(603).

The central control node(609) may be set in base station 1(605) or base station 2(607), or may be a stand-alone device(609) or functional unit.

In above mentioned system, base station 1(605) or base station 2(607) may send a signal according to the transmission mode of associated UEs. Or UE1(601) or UE2(603) may receive a signal according to the transmission mode of associated UEs.

The present application also provides an interference cancellation device.

Figure 7:
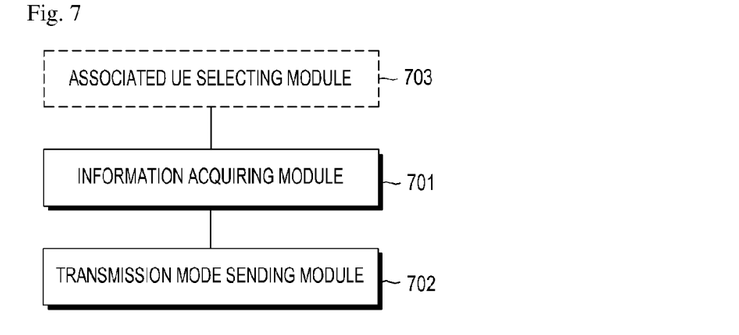
FIG. 7 is a schematic diagram illustrating an interference cancellation device according to an example of the present application.

FIG. 7 is a schematic diagram illustrating an interference cancellation device according to an example of the present application.

As shown in FIG. 7, the device includes an information acquiring module 701 and a transmission mode sending module 702.

The information acquiring module 701 is configured to acquire a SNR and INR of downlink signals detected by UE1 and that detected by UE2 respectively through base station 1 and base station 2. UE1 is located in a cell served by base station 1, and UE2 is located in a cell served by base station 2. UE1 and UE2 is a pair of associated UEs.

The transmission mode sending module 702 is configured to send transmission mode of the associated UEs to base station 1 and base station 2.

Above mentioned device may further include an associated UE selecting module 703 which is configured to select the associated UEs, namely UE1 and UE2.

In above mentioned device, the transmission mode of associated UEs includes a MCS of UE1, a demodulation order of UE1, a MCS of UE2, and/or a demodulation order of UE2.

Above mentioned device may be configured in base station 1 or base station 2, or may be a stand-alone device or functional unit.

The present application also provides a UE for interference cancellation.

Figure 8:
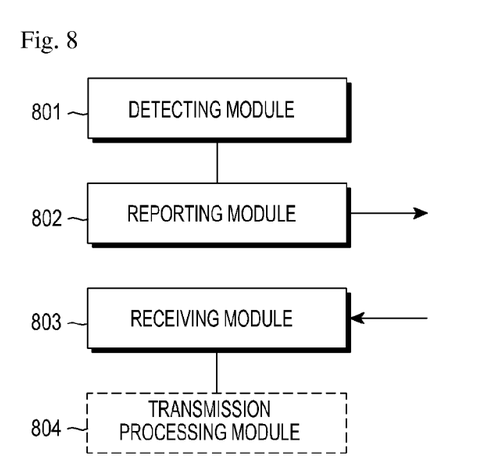
FIG. 8 is a schematic diagram illustrating an UE for achieving interference cancellation according to an example of the present application.

FIG. 8 is a schematic diagram illustrating an UE for achieving interference cancellation according to an example of the present application.

As shown in FIG. 8, the UE includes a detecting module 801, a reporting module 802, and a receiving module 803.

The detecting module 801 is configured to detect a SNR and INR of a downlink signal(s).

The reporting module 802 is configured to report the SNR and INR of a downlink signal(s) to the central control node through a base station.

The receiving module 803 is configured to receive a transmission mode of associated UEs including the UE sent, through the base station, by the central control node.

The detecting module 801 respectively detects signal power of a base station serving a cell where the UE is located, interference power of a base station serving an adjacent cell of the UE, and background noise power. The SNR is a ratio of the signal power of the base station serving the cell where the UE is located to the background noise power, and the INR is a ratio of the interference power of the base station serving the adjacent cell of the UE to the background noise power.

The transmission mode of associated UEs includes a MCS of the UE, a demodulation order of the UE, a MCS of another UE associated with the UE, and/or a demodulation order of another UE associated with the UE.

Above mentioned UE may further includes a transmission processing module 804 configured to receive a downlink signal according to the transmission mode of the associated UEs.

The foregoing is the specific achievements of an interference cancellation scheme of the present application. As can be seen from technical solutions of the present application, the UE reports INR information as well as SNR information to the base station; SNR and INR information of the two UEs are aggregated to the central control node (or some base station as a center) via inter-base station backbone network. By coordinating transmission data rates and modulation modes of two base stations, the central control node may create a situation conductive to delete interference, thereby enhancing the total data rate of two users interfering mutually, and improving network throughput.

The foregoing description is only preferred embodiments of the present application and is not used for limiting the protection scope thereof. Any modification, equivalent substitution, or improvement made without departing from the spirit and principle of the present application should be covered by the protection scope of the present application.

The invention claimed is:

1. A method for interference cancellation in a communication network including a plurality of user equipments (UEs) and base stations (BSs), the method comprising:
   acquiring, by a central control node, a first signal to noise ratio (SNR) and a first interference to noise ratio (INR) of a downlink signal detected by a first UE and a second SNR and a second INR of a downlink signal detected by a second UE, wherein the first SNR is determined based on signal power of a first BS detected by the first UE, the first INR is determined based on interference power of a second BS detected by the first UE, the second SNR is determined based on signal power of the second BS detected by the second UE, the second INR is determined based on interference power of the first BS detected by the second UE;
   determining, by the central control node, a maximum total data rate for the first UE and the second UE, a first transmission data rate for the first UE and a second transmission data rate for the second UE based on the first SNR, the first INR, the second SNR, and the second INR; and
   notifying, by the central control node, the first BS and the second BS of a transmission mode for the first UE and the second UE, wherein the transmission mode is determined based on the maximum total data rate, the first transmission data rate, and the second transmission data rate,
   wherein the first UE is located in a cell served by the first BS, and the second UE is located in an adjacent cell of the first UE and is served by the second BS.

2. The method according to claim 1, the first BS and the second BS are two macro base stations in a homogeneous network, or are respectively a macro base station and a micro base station in a heterogeneous network.

3. The method according to claim 1, wherein the first SNR is determined by the first UE based on signal power of a first BS and background noise power detected by the first UE, the first INR is determined by the first UE based on interference power of a second BS and the background noise power detected by the first UE, the second SNR is determined by the second UE based on signal power of the second BS and background noise power detected by the second UE and the second INR is determined by the second UE based on interference power of the first BS and the background noise power detected by the second UE.

4. The method according to claim 1, wherein the transmission mode comprises at least one of a modulation and coding scheme (MCS) of the first UE, a demodulation order of the first UE, a MCS of the second UE, and a demodulation order of the second UE.

5. The method according to claim 1, further comprising:
   notifying the first UE and the second UE of the transmission mode of associated UEs, respectively through the first BS and the second BS.

6. The method according to claim 1, wherein the central control node is configured as a stand-alone device or a functional unit in at least one of the first BS and the second BS.

7. The method according to claim 1, further comprising at least one of:
   sending, by the first BS or the second BS, a signal according to the transmission mode for the first UE and the second UE; and
   receiving, by the first UE or the second UE, the signal according to the transmission mode for the first UE and the second UE.

8. An apparatus for interference cancellation in a communication network including a plurality of user equipments (UEs) and base stations (BSs), the apparatus comprising:
   a processor configured to acquire a first signal to noise ratio (SNR) and a first interference to noise ratio (INR) of a downlink signal detected by a first UE and a second SNR and a second INR of a downlink signal detected by a second UE, wherein the first SNR is determined based on signal power of a first BS detected by the first UE, the first INR is determined based on interference power of a second BS detected by the first UE, the second SNR is determined based on signal power of the second BS detected by the second UE, the second INR is determined based on interference power of the first BS detected by the second UE, and the processor is configured to determine a maximum total data rate for the first UE and the second UE, a first transmission data rate for the first UE, and a second transmission data rate for the second UE, based on the first SNR, the first INR, the second SNR, and the second INR; and a transceiver configured to send a transmission mode for the first UE and the second UE to the first BS and the second BS, wherein the transmission mode is determined based on the maximum total data rate, the first transmission data rate, and the second transmission data rate, wherein the first UE is located in a cell served by the first BS, and the second UE is located in an adjacent cell of the first UE and is served by the second BS.

9. The apparatus according to claim 8, wherein the transmission mode comprises at least one of a modulation and coding scheme (MCS) of the first UE, a demodulation order of the first UE, a MCS of the second UE, and a demodulation order of the second UE.

10. The apparatus according to claim 8, wherein the apparatus is implemented in a central control node that is configured as a stand-alone device or a functional unit in at least one of the first BS and the second BS.

11. The apparatus according to claim 8, wherein the first BS and the second BS are two macro base stations in a homogeneous network, or are respectively a macro base station and a micro base station in a heterogeneous network.

12. The apparatus according to claim 8, wherein the first SNR is determined by the first UE based on signal power of the first BS and background noise power detected by the first UE, the first INR is determined by the first UE based on interference power of the second BS and the background noise power detected by the first UE, the second SNR is determined by the second UE based on signal power of the second BS and background noise power detected by the second UE, and the second INR is determined by the second UE based on interference power of the first BS and the background noise power detected by the second UE.

13. An apparatus in a first user equipment (UE) for interference cancellation in a communication network, the apparatus comprising:
 a processor, configured to determine a first signal to noise ratio (SNR) and a first interference to noise ratio (INR) of a downlink signal; and
 a transceiver, configured to report the first SNR and the first INR of the downlink signal to a central control node through the base station; and
 to receive information on a transmission mode of the first UE from the central control node through the first base station,
 wherein the transmission mode is determined by the central control node based on a maximum total data rate for the first UE and a second UE, a first transmission data rate for the first UE, and a second transmission data rate for the second UE,
 wherein the maximum total data rate, the first transmission data rate, and the second transmission data rate are determined based on the first SNR, the first INR, a second SNR, and a second INR, and
 wherein the first SNR is determined based on signal power of a first BS detected by the first UE, the first INR is determined based on interference power of a second BS detected by the first UE, the second SNR is determined based on signal power of the second BS detected by the second UE, and the second INR is determined based on interference power of the first BS detected by the second UE.

14. The UE according to claim 13, wherein the first SNR is determined by the first UE based on signal power of the first BS and background noise power detected by the first UE, the first INR is determined by the first UE based on interference power of the second BS and the background noise power detected by the first UE, the second SNR is determined by the second UE based on signal power of the second BS and background noise power detected by the second UE, and the second INR is determined by the second UE based on interference power of the first BS and the background noise power detected by the second UE.

15. The UE according to claim 13, wherein the transmission mode comprises at least one of a modulation and coding scheme (MCS) of the first UE, a demodulation order of the first UE, a MCS of the second UE and a demodulation order of the second UE.

16. The UE according to claim 13, wherein the transceiver receives a downlink signal according to the transmission mode of the first UE.

17. A method for interference cancellation of a user equipment (UE) in a communication network, the method comprising:
 determining a first signal to noise ratio (SNR) and a first interference to noise ratio (INR) of a downlink signal;
 reporting the first SNR and the first INR of the downlink signal to a central control node through the base station; and
 receiving information on a transmission mode of the first UE from the central control node through the first base station,
 wherein the transmission mode is determined by the central control node based on a maximum total data rate for the first UE and a second UE, a first transmission data rate for the first UE, and a second transmission data rate for the second UE,
 wherein the maximum total data rate, the first transmission data rate, and the second transmission data rate are determined based on the first SNR, the first INR, a second SNR, and a second INR, and
 wherein the first SNR is determined based on signal power of a first BS detected by the first UE, the first INR is determined based on interference power of a second BS detected by the first UE, the second SNR is determined based on signal power of the second BS detected by the second UE, and the second INR is determined based on interference power of the first BS detected by the second UE.

18. The method according to claim 17, wherein the first SNR is determined by the first UE based on signal power of the first BS and background noise power detected by the first UE, the first INR is determined by the first UE based on interference power of the second BS and the background noise power detected by the first UE, the second SNR is determined by the second UE based on signal power of the second BS and background noise power detected by the second UE, the second INR is determined by the second UE based on interference power of the first BS and the background noise power detected by the second UE.

19. The method according to claim 17, wherein the transmission mode comprises at least one of a modulation and coding scheme (MCS) of the first UE, a demodulation order of the first UE, a MCS of the second UE and a demodulation order of the second UE.

20. The method according to claim 17, further comprising:
 receiving a downlink signal according to the transmission mode of the first UE.

* * * * *